United States Patent
Tamari et al.

(10) Patent No.: US 9,604,648 B2
(45) Date of Patent: Mar. 28, 2017

(54) DRIVER PERFORMANCE DETERMINATION BASED ON GEOLOCATION

(71) Applicant: Lytx, Inc., San Diego, CA (US)

(72) Inventors: Roni Tamari, San Diego, CA (US); Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/627,974

(22) Filed: Feb. 20, 2015

(65) Prior Publication Data
US 2015/0307107 A1    Oct. 29, 2015

Related U.S. Application Data

(63) Continuation of application No. 13/271,009, filed on Oct. 11, 2011, now Pat. No. 8,996,234.

(51) Int. Cl.
| | |
|---|---|
| *B60W 40/09* | (2012.01) |
| *G06Q 40/08* | (2012.01) |
| *G07C 5/08* | (2006.01) |
| *G08G 1/00* | (2006.01) |

(52) U.S. Cl.
CPC ............ *B60W 40/09* (2013.01); *G07C 5/08* (2013.01); *G07C 5/085* (2013.01); *G07C 5/0808* (2013.01); *G08G 1/20* (2013.01); *B60W 2520/04* (2013.01); *B60W 2520/10* (2013.01); *B60W 2520/26* (2013.01); *B60W 2550/12* (2013.01); *B60W 2550/20* (2013.01); *G06Q 40/08* (2013.01)

(58) Field of Classification Search
CPC ............ G08G 1/00; G08G 1/20; G06Q 40/08
USPC ......... 701/123, 31.4, 1, 301, 29.3, 445–451, 701/469, 470; 705/4; 340/439, 989
See application file for complete search history.

(56) References Cited

U.S. PATENT DOCUMENTS

| | | | |
|---|---|---|---|
| 5,608,272 A | 3/1997 | Tanguay | |
| 6,057,754 A | 5/2000 | Kinoshita et al. | |
| 6,133,947 A * | 10/2000 | Mikuni .............. | G01C 21/3647 348/101 |
| 6,366,207 B1 | 4/2002 | Murphy | |
| 6,580,373 B1 | 6/2003 | Ohashi | |
| 6,593,848 B1 | 7/2003 | Atkins, III | |

(Continued)

FOREIGN PATENT DOCUMENTS

| | | |
|---|---|---|
| WO | 2011055743 | 5/2011 |
| WO | 2011133091 | 10/2011 |

OTHER PUBLICATIONS

U.S. Appl. No. 13/271,417, filed Oct. 12, 2011.
Charles Kitchin, Understanding Accelerometer Scale Factor and Offset Adjustments, 1995.

*Primary Examiner* — Tyler J Lee
(74) *Attorney, Agent, or Firm* — Van Pelt, Yi & James LLP

(57) ABSTRACT

A system for determining driver performance based on vehicle geolocation comprises one or more onboard vehicle sensors, one or more processors, and a memory. The one or more onboard vehicle sensors are configured to detect driving data of a moving vehicle. The one or more processors are configured to determine driver performance based at least in part on the driving data. The driver performance is normalized for a vehicle geolocation. The memory is coupled to the one or more processors and configured to provide the processor with instructions.

20 Claims, 8 Drawing Sheets

(56) References Cited

U.S. PATENT DOCUMENTS

| | | | |
|---|---|---|---|
| 6,665,613 B2* | 12/2003 | Duvall | B60R 25/1012 701/484 |
| 6,721,652 B1* | 4/2004 | Sanqunetti | G06T 3/60 701/468 |
| 6,859,705 B2 | 2/2005 | Rao et al. | |
| 7,254,482 B2 | 8/2007 | Kawasaki et al. | |
| 7,343,306 B1* | 3/2008 | Bates | G06Q 40/08 701/32.4 |
| 7,348,895 B2 | 3/2008 | Lagassey | |
| 7,386,376 B2 | 6/2008 | Basir et al. | |
| 7,389,178 B2 | 6/2008 | Raz et al. | |
| 7,561,054 B2 | 7/2009 | Raz et al. | |
| 7,659,835 B2 | 2/2010 | Jung | |
| 7,769,499 B2* | 8/2010 | McQuade | G07C 5/008 701/1 |
| 7,872,593 B1* | 1/2011 | Rauscher | G06T 5/50 340/539.25 |
| 8,054,168 B2 | 11/2011 | McCormick et al. | |
| 8,140,358 B1* | 3/2012 | Ling | G06Q 40/08 340/439 |
| 8,152,198 B2 | 4/2012 | Breed et al. | |
| 8,260,489 B2* | 9/2012 | Nielsen | G07C 5/085 701/32.2 |
| 8,301,374 B2* | 10/2012 | Surampudi | G01C 21/005 701/23 |
| 8,428,307 B2* | 4/2013 | Bradai | G08G 1/09626 382/104 |
| 8,471,701 B2* | 6/2013 | Yariv | G01C 21/3679 340/539.13 |
| 8,538,785 B2* | 9/2013 | Coleman | G06Q 40/08 705/4 |
| 8,699,800 B1* | 4/2014 | Chau | G06F 17/30265 382/201 |
| 8,849,501 B2 | 9/2014 | Cook et al. | |
| 8,854,199 B2 | 10/2014 | Cook et al. | |
| 2001/0005804 A1 | 6/2001 | Rayner | |
| 2002/0008758 A1* | 1/2002 | Broemmelsiek | G01S 3/7864 348/143 |
| 2002/0111725 A1* | 8/2002 | Burge | G06Q 40/08 701/31.4 |
| 2003/0055557 A1 | 3/2003 | Dutta et al. | |
| 2004/0236475 A1 | 11/2004 | Chowdhary | |
| 2004/0236476 A1 | 11/2004 | Chowdhary | |
| 2004/0236596 A1 | 11/2004 | Chowdhary et al. | |
| 2004/0243308 A1 | 12/2004 | Irish et al. | |
| 2005/0185052 A1 | 8/2005 | Raisinghani et al. | |
| 2005/0209776 A1 | 9/2005 | Ogino | |
| 2005/0216186 A1* | 9/2005 | Dorfman | G06F 17/30241 701/408 |
| 2006/0053038 A1* | 3/2006 | Warren | G06Q 40/08 705/4 |
| 2006/0200305 A1* | 9/2006 | Sheha | G01C 21/20 701/420 |
| 2006/0253307 A1* | 11/2006 | Warren | G06Q 40/08 705/4 |
| 2007/0001831 A1* | 1/2007 | Raz | B60R 16/0231 340/439 |
| 2007/0005404 A1 | 1/2007 | Raz et al. | |
| 2007/0257782 A1 | 11/2007 | Etcheson | |
| 2008/0111666 A1 | 5/2008 | Plante et al. | |
| 2008/0243389 A1 | 10/2008 | Inoue et al. | |
| 2008/0285886 A1* | 11/2008 | Allen | G06F 17/30241 382/284 |
| 2009/0009321 A1 | 1/2009 | McClellan et al. | |
| 2009/0051510 A1 | 2/2009 | Follmer et al. | |
| 2009/0074249 A1* | 3/2009 | Moed | G06K 9/00818 382/104 |
| 2009/0140887 A1* | 6/2009 | Breed | G01C 21/165 340/990 |
| 2009/0157255 A1 | 6/2009 | Plante | |
| 2009/0187300 A1* | 7/2009 | Everitt | G01C 21/3602 701/31.4 |
| 2009/0299622 A1 | 12/2009 | Denaro | |
| 2010/0033571 A1* | 2/2010 | Fujita | B60W 40/02 348/149 |
| 2010/0045451 A1 | 2/2010 | Periwal | |
| 2010/0063680 A1 | 3/2010 | Tolstedt et al. | |
| 2010/0063850 A1 | 3/2010 | Daniel | |
| 2010/0076621 A1 | 3/2010 | Kubotani et al. | |
| 2010/0100315 A1 | 4/2010 | Davidson et al. | |
| 2010/0104199 A1 | 4/2010 | Zhang et al. | |
| 2010/0191411 A1 | 7/2010 | Cook et al. | |
| 2010/0208070 A2* | 8/2010 | Haynes | G07C 5/085 348/148 |
| 2010/0211270 A1* | 8/2010 | Chin | B62D 6/007 701/44 |
| 2010/0250021 A1 | 9/2010 | Cook et al. | |
| 2010/0250045 A1 | 9/2010 | Miura et al. | |
| 2010/0250116 A1 | 9/2010 | Yamaguchi et al. | |
| 2010/0253918 A1 | 10/2010 | Seder et al. | |
| 2010/0256858 A1* | 10/2010 | Yago | G07C 5/0891 701/29.1 |
| 2010/0256863 A1* | 10/2010 | Nielsen | G07C 5/085 701/31.4 |
| 2010/0283633 A1 | 11/2010 | Becker et al. | |
| 2010/0328009 A1 | 12/2010 | Tawa | |
| 2011/0093159 A1 | 4/2011 | Boling et al. | |
| 2011/0095908 A1* | 4/2011 | Nadeem | B60H 3/00 340/905 |
| 2011/0130916 A1 | 6/2011 | Mayer | |
| 2012/0123806 A1* | 5/2012 | Schumann, Jr. | G08G 1/096775 705/4 |
| 2012/0283895 A1 | 11/2012 | Noda | |
| 2013/0006469 A1 | 1/2013 | Green et al. | |

* cited by examiner

DRIVER PERFORMANCE DETERMINATION BASED ON GEOLOCATION

CROSS REFERENCE TO OTHER APPLICATIONS

This application is a continuation of U.S. patent application Ser. No. 13/271,009 issued as U.S. Pat. No. 8,996,234, entitled DRIVER PERFORMANCE DETERMINATION BASED ON GEOLOCATION filed Oct. 11, 2011 which is incorporated herein by reference for all purposes.

BACKGROUND OF THE INVENTION

There is a need in fleet management to accurately determine driver performance. Such information can be used to properly reward safe driving behavior, provide helpful feedback to driver for future improvement, and fairly assess insurance costs. Currently, driver performance is evaluated by monitoring driver behavior and vehicle operation through a variety of sensors placed onboard vehicles. Drive events captured via the onboard sensors are scored to provide measurements of driver performance. However, currently the effect of driving conditions such as road conditions or weather conditions posed by different geolocations are not accounted for in evaluating driver performance. As a result, a driver that happens to take a more challenging route may be evaluated unfairly compared to a driver that happens to take an easier route. For example, a driver taking a route that requires driving mostly through city streets and frequent stops will tend to have a worse than average fuel efficiency even if the driver exhibits fuel efficient driving behavior. For another example, a driver taking a route through an area that is experiencing severe weather such as snow storms or blizzards may have more drive events such as skips captured even if the driver is a safe driver. Failure to properly consider the effect of driving conditions on driver performance therefore results in inaccurate driver performance assessment.

BRIEF DESCRIPTION OF THE DRAWINGS

Various embodiments of the invention are disclosed in the following detailed description and the accompanying drawings.

DETAILED DESCRIPTION

Figure 1:
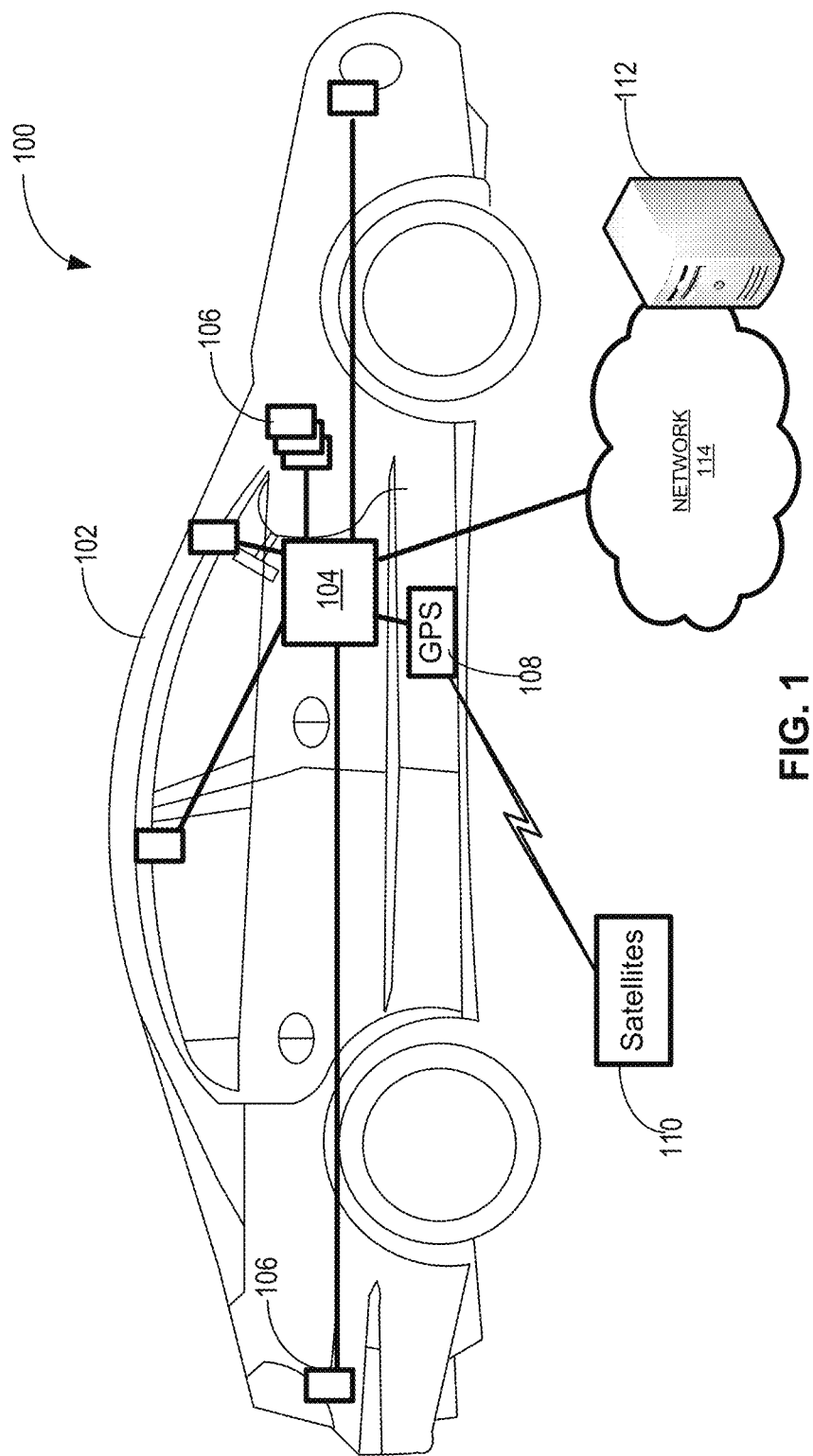
FIG. 1 is a block diagram illustrating a system for assessing performance of a driver in accordance with various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for assessing driver performance based on vehicle geolocation is disclosed. The system comprises one or more onboard vehicle sensors configured to detect driving data of a moving vehicle and one or more processors configured to determine driver performance based at least in part on the driving data. The driver performance is normalized for a vehicle geolocation.

In some embodiments, a driver's performance is determined based at least in part on evaluating driving data associated with a driver. The driving data is evaluated based on geolocations associated with the driving data. The driving data is normalized based on the geolocations associated with the driving data such that the driving conditions are accounted for in evaluating the driver's performance. For example, road conditions whether static (e.g., bumps or curves or steep grades) or dynamic (e.g., weather or traffic) conditions affect driver performance and need to be normalized for when evaluating a driver's performance.

In various embodiments, the onboard vehicle sensors include image capturing devices such as video cameras and still cameras for monitoring driver behavior and driving environment such as road conditions, weather conditions, and traffic conditions. In various embodiments, the driver performance measures driver safety performance and/or driver fuel efficiency performance. In various embodiments, normalizing the driver performance over vehicle geolocation comprises applying a drive performance evaluation criteria associated with the vehicle geolocation. In various embodiments, normalizing the driver performance over the vehicle geolocation includes calculating a performance score based at least in part on the vehicle geolocation. The drive performance evaluation criteria normalize the effect of a drive condition's level of difficulty on the drive performance of a driver.

FIG. 1 is a block diagram illustrating a system for assessing performance of a driver in accordance with various embodiments. In the example shown, vehicle 102 is equipped with onboard computer 104 that interfaces with various onboard vehicle sensors 106. Onboard computer 104 includes one or more processors that are capable of executing computer instructions for carrying out various functions involved in assessing driver performance. Onboard computer 104 further includes one or more data storages for storing computer instructions, rules, algorithms, driving data, various databases and maps such as digital safety map. Onboard computer 104 further includes one or more communication interfaces 206 for communicating with onboard sensors 106 (including GPS receiver 108) and remote server 112 sitting on network 114. Communication interfaces can include interfaces for wired and/or wireless (short range or long range) links, direct and/or indirect communication links. Example include interfaces for USB cable, vehicle bus (e.g., on-board diagnostics (OBD) interface, global positioning system (GPS), Bluetooth™, ZigBee™ link, IEEE 802.11 point-to-point link, and wire/wireless data network link. Network 108 can include wired or wireless network such as wired or wireless phone network, local area network (LAN), and wide area network (WAN).

In various embodiments, the one or more onboard sensors 106 include at least an image capturing device (e.g., video camera and still camera), geolocation data receiver 108 for receiving geolocation data, and a sensor for detecting vehicle operation state. In the example shown, geolocation data receiver 108 includes global positioning system (GPS) receiver 108 configured to receive geolocation data from one or more satellites 110. It is possible that one or more onboard sensors (e.g., a GPS receiver, an accelerometer) are incorporated into the onboard computer. Alternatively, the onboard sensors can be separate from onboard computer 104. Onboard sensors 106 can be configured to detect various driving data during vehicle operation, including driver behavior, vehicle operation state, and/or various driving conditions or environmental parameters. The driving conditions may include road conditions, weather conditions, and/or traffic conditions. In various embodiments, circuitries, processors, storage devices or circuits, and/or communications interfaces can be included in one or more sensors for carrying out various functions such as capturing, storing, processing, and/or transmitting sensor data. For example, a sensor on/off circuitry may be included to turn on/off the sensor, a data capture circuitry may be included to capture sensor data, and a communications interface circuitry may be included to transmit sensor data to a remote server. These sensor functions may be performed automatically by the sensor or carried out in response to external commands issued for example by onboard vehicle computer 104. In various embodiments, one or more data storages are included in or associated with one or more sensors for storing computer instructions and sensor data. Data storages may include internal or external, fixed or removable, persistent and/or volatile memory. Onboard computer 104 is configured to receive sensor data from one or more onboard sensors and receive other information from other external source(s) (e.g., satellite GPS location data, weather information, and/or road map information) via the various communications interfaces. For example, still or moving images from various viewing perspectives, speed, acceleration and direction of the vehicle, the geolocation of the vehicle, environmental temperature and moisture level may be received from various onboard sensors. The received sensor data may be analyzed to assess driver performance. The data from different sensors may be correlated to time and geolocation of the moving vehicle.

In various embodiments, onboard computer 104 may be configured to perform analyses of the detected driving data. Since the computation capacity of the onboard computing device may be limited, such analyses may be preliminary analyses and less robust or complex than those that can be performed on a remote server that has more computation power. In various embodiments, onboard computer 104 may be configured to upload the driving data (e.g., sensor data and/or analysis data) to the remote server 112 for further analysis, processing, and/or storage. Uploading can be carried automatically by the onboard computer based on predefined criteria or upon requests by for example the remote server 112. The remote server may perform more detailed and/or additional analysis of the driving data. For example, the server may use the driving data to identify the driver, for analysis, to determine driver performance, such as determine driver attitude (e.g., recklessness) and skill, to calculate driver risk score, to generate a driver profile, to identify dangerous and/or erratic driving behavior, to identify driver deviation from his/her normal driving behavior (by comparing with his/her drive profile, etc.), to identify a high risk driver, to perform risk analysis for a group of drivers or for an entire fleet, to calculate insurance, and/or to generate various reports.

Figure 2:
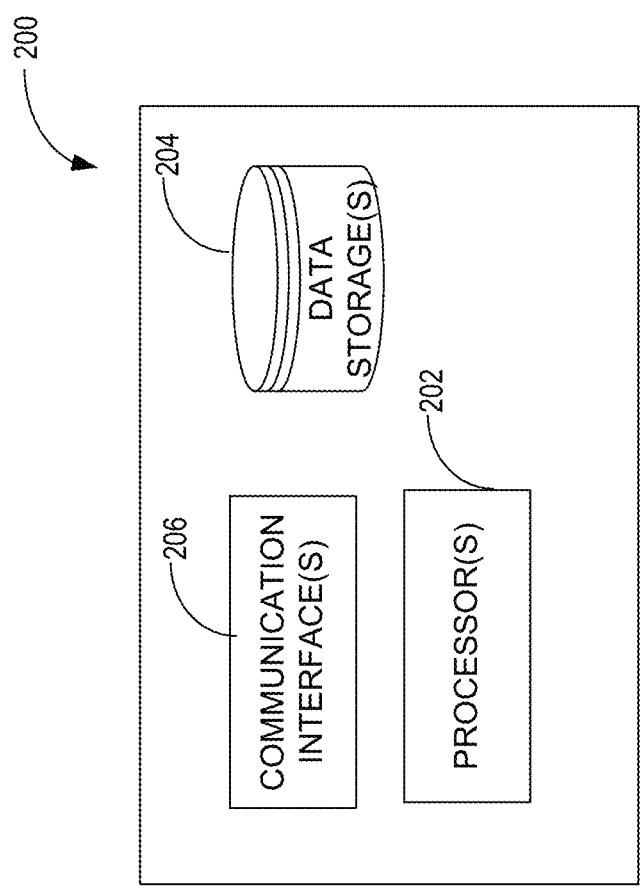
FIG. 2 is a block diagram illustrating an embodiment of a drive event detector.

FIG. 2 is a block diagram illustrating an embodiment of a drive event detector. In some embodiments, drive event detector 200 is used to implement drive event detector 104 of FIG. 1. In the example shown, drive event detector 200 includes one or more computer processors 202 that are capable of executing computer instructions for carrying out various functions of the drive event detector 200. It additionally includes one or more data stores 204 for storing computer instructions, raw sensor data, derived sensor data (metadata), and/or other drive event related data. The drive event detector 200 further includes one or more communication interfaces 206 for communicating with the one or more onboard sensors. Drive event detector 200 is further communicatively linked to a remote server sitting on a data network and configured to receive and/or transmit data from the server.

Figure 3:
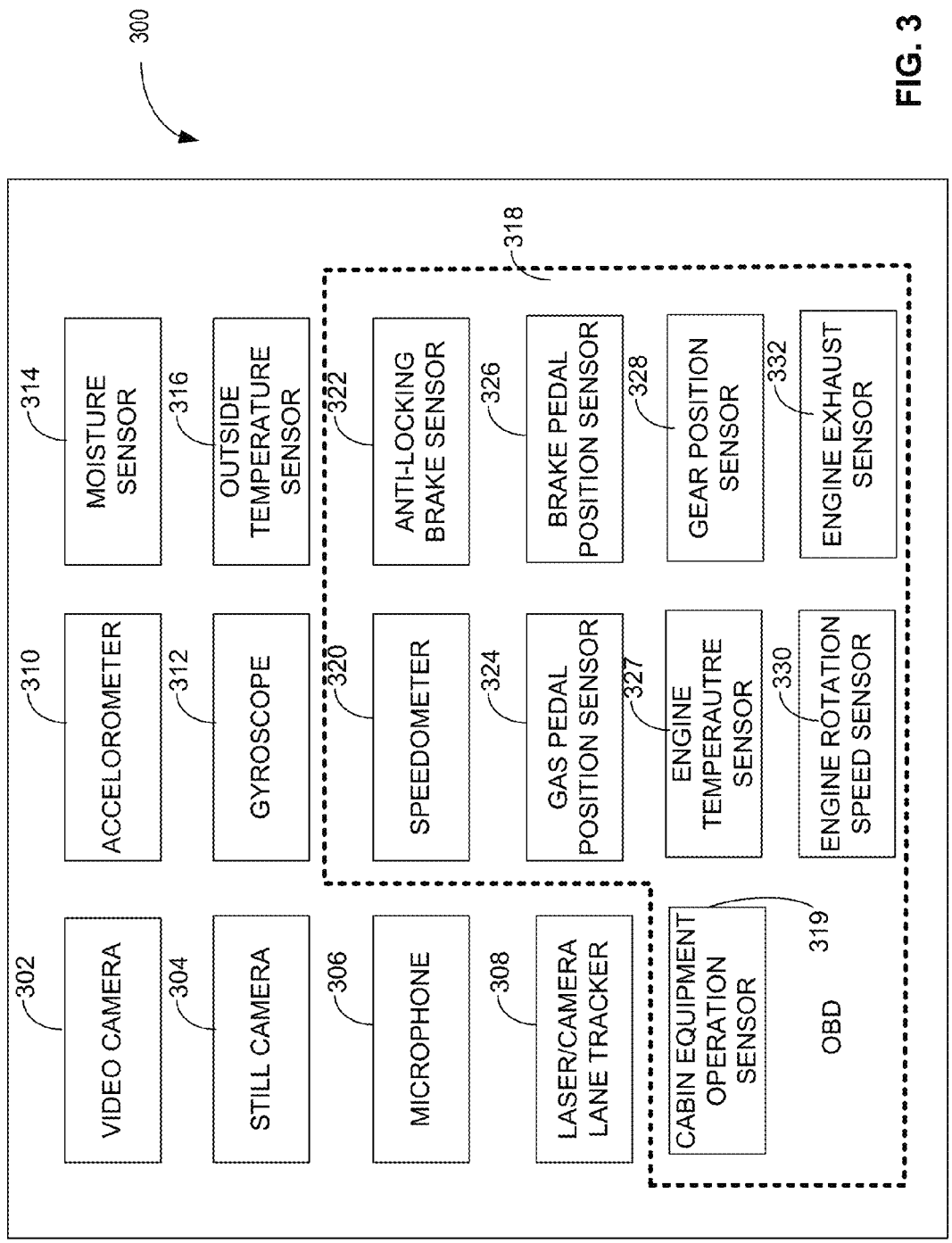
FIG. 3 is a block diagram illustrating the various onboard sensors for detecting driving data in accordance with various embodiments.

FIG. 3 is a block diagram illustrating the various onboard sensors for detecting driving data in accordance with various embodiments. In the example shown, one or more sensors 300 are shown that are located on or around the vehicle. For example, one or more video cameras 302 and/or still cameras 304 may be mounted at various positions on the vehicle to capture the cabin view, an exterior view such as a front view, a rear view, a left side view, and/or a right side view. The video cameras and the still cameras may be equipped with infrared emitters for improved night vision and/or for imaging driver facial features through dark sun glasses. The video cameras and/or the still cameras may be stereo video cameras and/or still cameras that are capable of capturing 3-D images. The captured images may be used to identify the driver and to record driver behavior and circumstances leading up to, during, and immediately after a drive event. The captured images may be used to recognize road signs such as posted speed limit signs. One or more microphones 306 may be placed inside and/or outside the cabin to record audio sounds. One or more laser and/or camera based lane tracking sensor 308 may be positioned in the front and/or at the back of the vehicle to track drifting of the vehicle within or out of a lane. In one example, a video camera is mounted in the overhead console above the mirror to track the lane markings on the roadway. The captured video images may be processed using one or more processors to determine whether the vehicle has departed from its proper lane and by how much. One or more accelerometers 310 may be placed onboard the vehicle to monitor acceleration along one or more vehicle axes. The axes of vehicle acceleration may include the longitudinal vehicle axis—the axis substantially in the direction of the vehicle's principal motion, the traverse (lateral) vehicle axis—the substantially horizontal axis substantially orthogonal to the vehicle's principle motion, and the vertical vehicle axis—the axis orthogonal to both the longitudinal vehicle axis and the traverse vehicle axis. Accelerometer 310 may be a built-in accelerometer put in place by the vehicle manufacture or may be an add-on accelerometer added after manufacturing. Gyroscope 312 may be placed on board the vehicle to detect an angular orientation and rate of vehicle rotation. The rotation is typically measured in reference to one of three axes: yaw, pitch and roll. Moisture sensor 314 may be mounted on the outside of the vehicle to detect environmental moisture level, which provides an indication whether it is raining outside the vehicle. Temperature sensor 316 may be mounted on the outside of the vehicle to detect environmental temperature, which provides information as to how cold the outside environment is and whether it is below freezing and by how much. In addition, onboard computer 104 may also have the capability to access information detected by one or more vehicle sensors built in the vehicle by the manufacture via a vehicle bus interface such as OBD interface 318. For example, via OBD interface 318, onboard computer 104 can access manufacturer built-in speedometer 320 for detecting vehicle speed, anti-lock brake system speed sensor 322 for detecting the rate at which the vehicle wheels are moving and whether the anti-locking brakes have been engaged, gas pedal position sensor 324 and brake pedal position sensor 326 for detecting the gas pedal and brake pedal position (e.g., a pedal depression in degrees), engine temperature sensor 326 for sensing engine temperature, gear position sensor 328 for sensing gear position/selection, engine rotation speed sensor 330 for sensing the engine rotation speed, and engine exhaust sensor 332 for sensing composition and temperature of engine exhaust. The onboard vehicle sensors are not limited by the examples provided here. The examples shown are not limiting. Other vehicle sensors may also be included, such as shock sensor, various cabin equipment operation sensors that can be accessed through the vehicle bus that provide information regarding operation of windshield wipers, state of lights (e.g., on, off, fog lights, blights, etc.), operation of equipment within the vehicle such as radios, cellular phones, DVD players, the volume at which the audio equipment is operated, the identity of the driver based on the entry of an identification number, seat settings, weight, status of seat belts, number of passengers, sensors for range and distance detection (e.g., radar sensor systems, sonar sensor systems, stereo imaging distance systems, etc.), or any other appropriate sensors.

Figure 4:
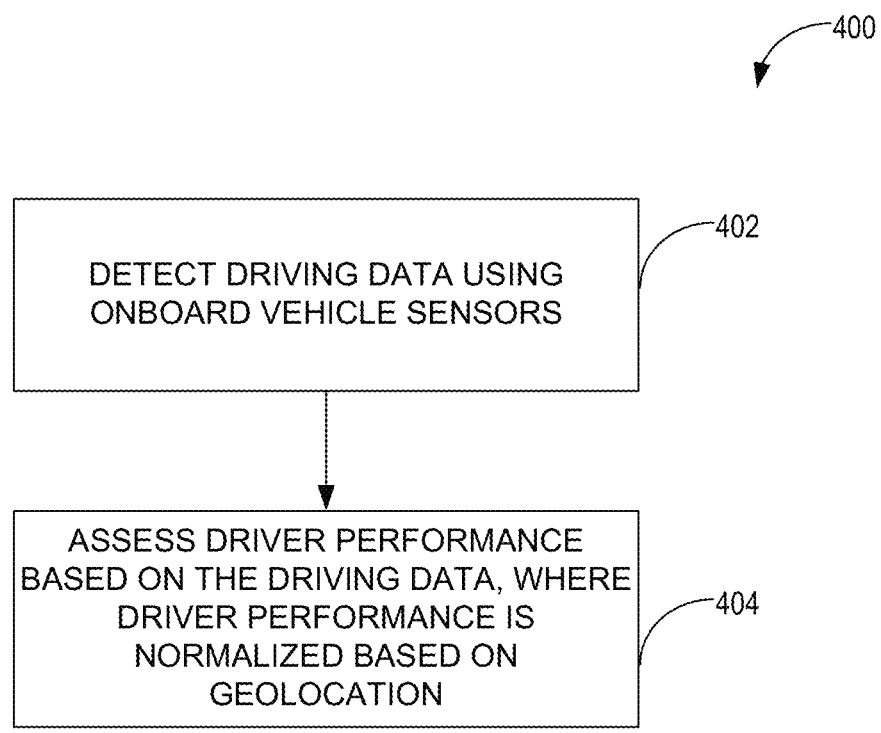
FIG. 4 is a block diagram illustrating an example process for assessing driver performance based on geolocation.

FIG. 4 is a block diagram illustrating an example process for assessing driver performance based on geolocation. In various embodiments, process 400 can be performed by an onboard computer and/or a remote server.

In 402, driving data is detected using onboard vehicle sensors. For example, driving data of a moving vehicle driven by a driver is detected using sensors placed on board the moving vehicle. In various embodiments, detecting driving data includes capturing images (e.g., moving or still images) of the driver, the vehicle, and/or the surrounding environment during vehicle operation. Images of the driver captured during vehicle operation can be used to identify the driver and to provide visual clues as to driver behavior during vehicle operation, particularly during the time period leading up to, during, and immediately after a driving occurrences, incidents, or events. Images of the surrounding environment can be used to determine driving conditions such as road conditions, weather conditions, and traffic conditions, and how close a vehicle is following the vehicle in front of it, whether there are vehicles close by in the adjacent lanes when the vehicle is switching lanes, and the behavior of surrounding vehicles. Images of the surrounding environment can also be used to identify a road sign (e.g., stop sign), traffic lights, and intersections, etc. when processed using an image recognition algorithm. Images of the road adjacent to the moving vehicle can be used to determine whether the vehicle has drifted in the lane or out of the lane. In some embodiments, audio signals can also be detected. In various embodiments, detecting driving data includes detecting various parameters relating to vehicle operation states, such as vehicle speed, acceleration, deceleration (e.g., forward and lateral), rotation, uphill/downhill grade, engine temperature, engine speed, gear position, gas pedal position, brake pedal position, operation of windshield wipers, state of lights, operation of equipment such as operation of radios and DVD players, seat belt use, seat setting, and collision force experienced by the vehicle. In various embodiments, detecting driving data includes detecting various environmental parameters using various non-visual sensors. Such parameters may include outside temperature, moisture level, lighting condition, and visibility, etc. In various embodiments, detecting driving data involves analyzing the sensor data and determining whether a drive event or a potential drive event has occurred and then subsequently capturing, storing, uploading (e.g., to a remote server) and analyzing the drive event or potential drive event (e.g., classifying and scoring drive events).

In 404, driver performance is assessed based on the driving data, where the driver performance is normalized based on geolocation. A driver's performance can be any suitable type of driver performance relating to vehicle operation. In some embodiments, the driver performance is a measure of driver safety performance. In some embodiments, the driver performance is a measure of driver fuel efficiency performance. As discussed previously, different geolocations pose different driving conditions and different performance challenges to drivers. To accurately assess a driver's intrinsic drive performance and accurately compare driving performance among different drivers, it is important to separate out the effects of geolocation (e.g., the routes and the relative conditions of the routes) on driver performance and to normalize driver performance over geolocations. In some embodiments, rule(s) are used to determine the performance score.

In some embodiments, an example rule comprises a "following rule"—during normal weather, a vehicle is able to safely follow a vehicle by keeping a "3 seconds distance" behind a vehicle in front of it, but if the weather conditions are harsh, the rule changes such that a minimum of 4 or 5 seconds distance are necessary for safety. In some embodiments, the rule for acceptable distance to drive behind a vehicle in front either in normal weather or in bad weather are specified as 'X' seconds and 'Y' seconds, 'X' feet and 'Y' feet, or any other appropriate specification. In some embodiments, an example rule comprises a "traffic speed rule"—driving on a freeway at 70 mph is fine during normal traffic patterns, but if the road is congested and other vehicles are driving an average of 30 miles per hour, the driver's performance evaluation takes into account the average speed on the road at the time the vehicle was there. In some embodiments, the rule for acceptable driving speed is specified as 'X' miles per hour on a freeway in good weather unless the average driving speed on the road is less than 20% lower than 'X' at which point the acceptable driving speed is lowered to the average driving speed on the road. In some embodiments, an example rule for idling—if the vehicle is undergoing repair, it may need to be idling for an extended period of time while the mechanic is working on it to check something (e.g., geolocation corresponding to mechanic or repair garage) or if the vehicle is a long distance coach bus, it may idle at rest stops to maintain air conditioning for passengers (e.g., geolocation corresponding to a rest stop), but may not be allowed to idle while in the company's parking lot (e.g., geolocation corresponding to a parking lot). In some embodiments, the idling rule for acceptable idling time is set based at least in part on the geolocation and a database that includes an acceptable idling time corresponding to a geolocation, a type of geolocation, or any other determination of acceptable idling time corresponding to geolocation.

In various embodiments, normalizing driver performance over a geolocation involves applying a drive performance evaluation criteria associated with the geolocation of a moving vehicle to assess driver performance for trips that include the geolocation. The drive performance criteria associated with the geolocation are defined in such a way that normalizes the effect of how challenging the driving conditions associated with the geolocation are on a driver's performance. For example, since driving on an icy steep road is significantly more challenging than driving on a dry flat road, drive performance evaluation criteria are different for the two road conditions—a driver that has a drive event (e.g., an accident characterized by a sensor data profile) on an icy steep road is assigned a better drive performance score than a driver that has a similar drive event (e.g., an accident characterized by a similar sensor data profile) based on the drive performance evaluation criteria associated with the two geolocations in a way that reflects the different challenges posed by the two geolocations.

In various embodiments, geolocation criteria and their impact on drive performance comprise: a) a geolocation criteria associated with long and winding roads and highways such that a weighting of performance scores more for a driver whose route includes long and winding roads (e.g., where more concentration is required to drive) compared to a driver whose route includes only highways for the same driving time or driving distance with the same type of driving data is collected for each of the drives (e.g., driving events); b) a geolocation criteria associated with a geofence boundary for a bad neighborhood such that a performance score is reduced if the geofence bounded area is entered (e.g., it is against a company policy to enter the area); c) a geolocation criteria associated with a school zone such that a performance score is reduced if a driver is driving over a limit in the zone (e.g., a driver is driving more than 10 miles per hour over the posted speed limit in the school zone); d) a geolocation criteria associated with a weather zone such that a vehicle within a weather zone has a reduced impact to the performance score for a driving event (e.g., an accident, loss of control, etc.) compared to in normal weather conditions, or any other appropriate criteria. In various embodiments, the geolocation criteria are implemented either by uploading to the device geolocation data that allows for heightened or lowered sensitivity for particular geolocations and/or by having the server make adjustments based on the geolocation data.

In various embodiments, normalizing driver performance over geolocation involves applying a normalizing weight associated with a geolocation to a drive performance score or an evaluation of a driver driving through the geolocation. A performance score may be calculated for a drive event at or trip through the geolocation based on various sensor data, the performance score is then normalized by a performance weight assigned to the geolocation, where the performance weight reflects the performance challenge of the geolocation. For example, a first performance score is calculated for a first drive event or trip at a first geolocation based on various sensor data captured while the vehicle is traveling through the first location, the performance score is multiplied by a first normalizing weight assigned to the first geolocation. Similarly, a second performance score may be calculated for a second geolocation based on various sensor data, the second performance score is multiplied by a second normalizing weight assigned to the second geolocation. The normalizing weights assigned to the first geolocation and the second geolocation each represents the performance challenge posed by the respective geolocation, the normalized performance scores are normalized to separate out the effect of the geolocation on a driver's performances.

Figure 5:
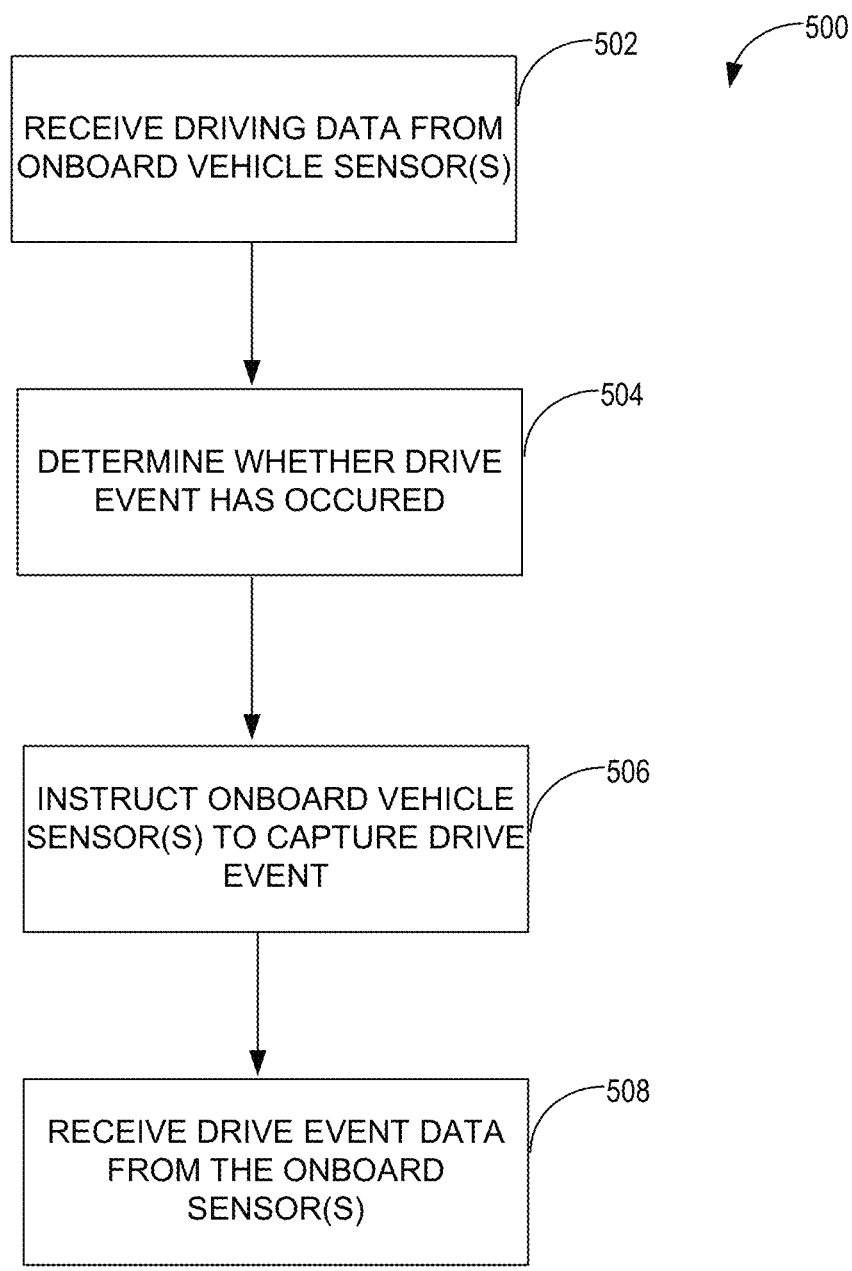
FIG. 5 is a block diagram illustrating an example process for detecting driving data.

FIG. 5 is a block diagram illustrating an example process for detecting driving data. In various embodiments, process 500 can be performed by an onboard computer and/or a remote server. In this example, detecting driving data involves detecting data related to drive events. Driving events may comprise accidents, near-accidents, traffic law violations, company rule violations, driving occurrences or behaviors that increase the risk of accidents or otherwise pose a risk or a financial liability to an owner or an employer, and/or driving occurrences or behaviors that reflect the attitude (e.g., recklessness) or driving skill of a driver, or otherwise have a bearing on evaluating the driving performance of a driver. In some embodiments, driving non-events are occurrences and/or behaviors relating to the safe and sound operation of a vehicle.

In 502, driving data are received from onboard vehicle sensor(s). For example, sensor data may include raw sensor data and/or processed sensor data (e.g., data filtered using a low-pass filter). In some embodiments, a sensor transmits the sensor data automatically or upon request (e.g., a request from a drive event detector).

In 504, a determination is made as to whether a drive event has occurred. In some embodiments, the determination that a drive event has occurred is made based at least in part on one or more predefined criteria such as whether one or more sensor data values exceed predefined threshold values or fit predefined profiles. In some embodiments, a profile comprises a set of sensor measurements are within ranges or exceed threshold based on a pattern of sensor values. In various embodiments, a profile is defined as one of the following: a) a speed violation profile comprises a location of the vehicle at a specific geolocation and a speed of the vehicle that exceeds the speed limit associated with the specific geolocation; b) a speed cap profile comprises a vehicle is a specific type of vehicle (e.g., a school bus, a waste truck, etc.), a location of the vehicle at a specific geolocation, and a speed of the vehicle that exceeds the speed limit associated with the specific geolocation and exceeding the speed limit by a threshold associated with the specific type of vehicle; c) a sharp turn profile comprises a vehicle direction reading showing a change, a vehicle speed threshold exceeding a threshold, an accelerometer reading exceeding a threshold; d) an unsafe shift in lanes profile comprises a vehicle lateral acceleration exceeding a threshold and a vehicle speed above a value; e) an side collision profile comprises a vehicle lateral acceleration exceeding a threshold and a vehicle speed above a value; or any other appropriate profile set of measurements.

For example, a potential collision is detected when a sudden deceleration is sensed by an onboard accelerometer, where the accelerometer data values exceed a predefined threshold or the values have a similar pattern or shape as a predefined profile. In various embodiments, a score is calculated based on received sensor data, and the score is used to determine whether a potential drive event or an actual drive event has occurred. For example, if the event score is above a predefined threshold, it is determined that a potential or actual drive event has occurred. In various embodiments, one or more algorithms are used by the local event detector to calculate a local event data score. In some embodiments, the algorithms used may not be as robust or as accurate as an event scoring system run on a remote server. In some embodiments, processing capability resident on the vehicle is less than processing capability of a remote server.

In 506, onboard vehicle sensor(s) are instructed to capture drive event. In various embodiments, this involves instructing one or more sensors to capture pre-event data, during-event data, and post-event data. The capture of pre-event data is enabled by the use of memory buffers that continuously save sensor data in a continuous loop. In various embodiments, capturing the event data includes instructing the sensor(s) to save data stored in one or more sensor memory buffers to a persistent storage unit and/or upload the data to the drive event detector. The capturing of pre-event, during-event, and post-event data allows the circumstances leading up to the event (e.g., accident), during the event, and after the event to be documented.

In 508, drive event data is received from onboard vehicle sensor(s). The captured drive event data received includes, for example, at least video, image, and/or audio, time, and GPS location data together with one or more other onboard sensor data relating to vehicle operation states such as vehicle speed, acceleration/deceleration, and orientation. In various embodiments, the drive event data which includes data from one or more sensors are saved to a single record, file, folder, directory, or otherwise organized in such a way that they can be easily identified as belonging to a particular drive event (e.g., associated with a unique drive event ID). In various embodiments, the event data from different sensors are time-synchronized by the drive event detector.

Figure 6:
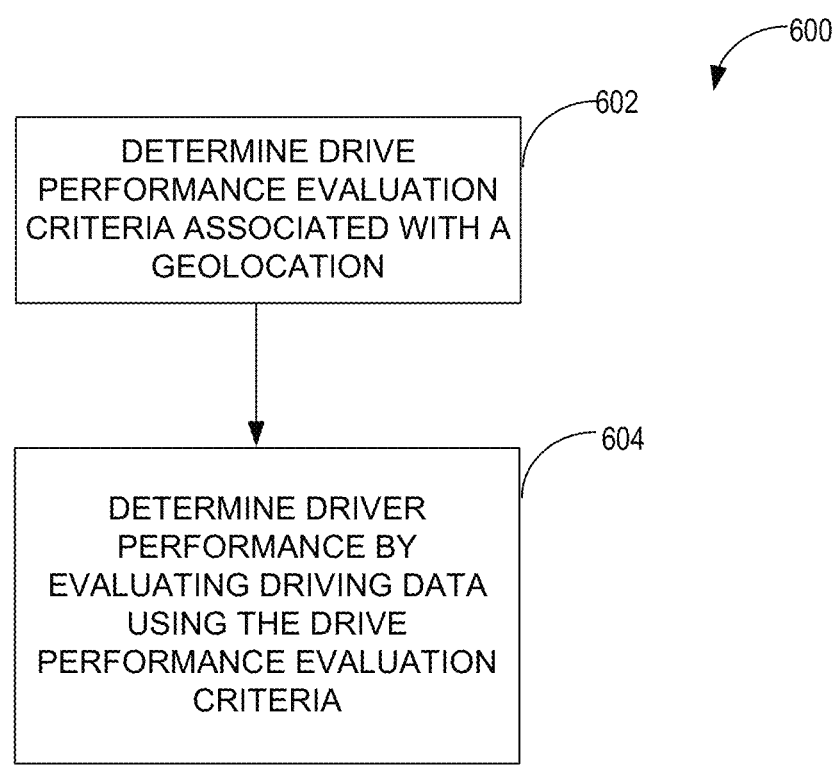
FIG. 6 is block diagram illustrating an example process for assessing driver performance that is normalized over geolocation.

FIG. 6 is block diagram illustrating an example process for assessing driver performance that is normalized over geolocation. In various embodiments, process 600 can be performed by an onboard computer and/or a remote server. In 602, drive performance evaluation criteria associated with the geolocation is determined. In various embodiments, the geolocation of the moving vehicle is determined based on satellite geolocation data received from a set of satellites or cellular geolocation data received from a cellular tracking system. The drive performance evaluation criteria associated with the geolocation is determined by looking up in a database that stores associated geolocation and drive performance evaluation criteria. In various embodiments, the geolocation is defined using a set of geographic coordinates (e.g., longitude, latitude, and/or altitude). In various embodiments, the geolocation is defined as a geo-fenced area within which the moving vehicle is located. A geo-fenced area is a geographical area defined by a geo-boundary. In 604, driver performance is determined by evaluating the driving data captured using drive performance evaluation criteria. For example, the performance of a driver is determined by evaluating the driving data using criteria associated with the geolocation where the driving data was measured. In various embodiments, the drive performance criteria include performance normalization weight that normalizes the drive performance based on a geolocation.

Figure 7:
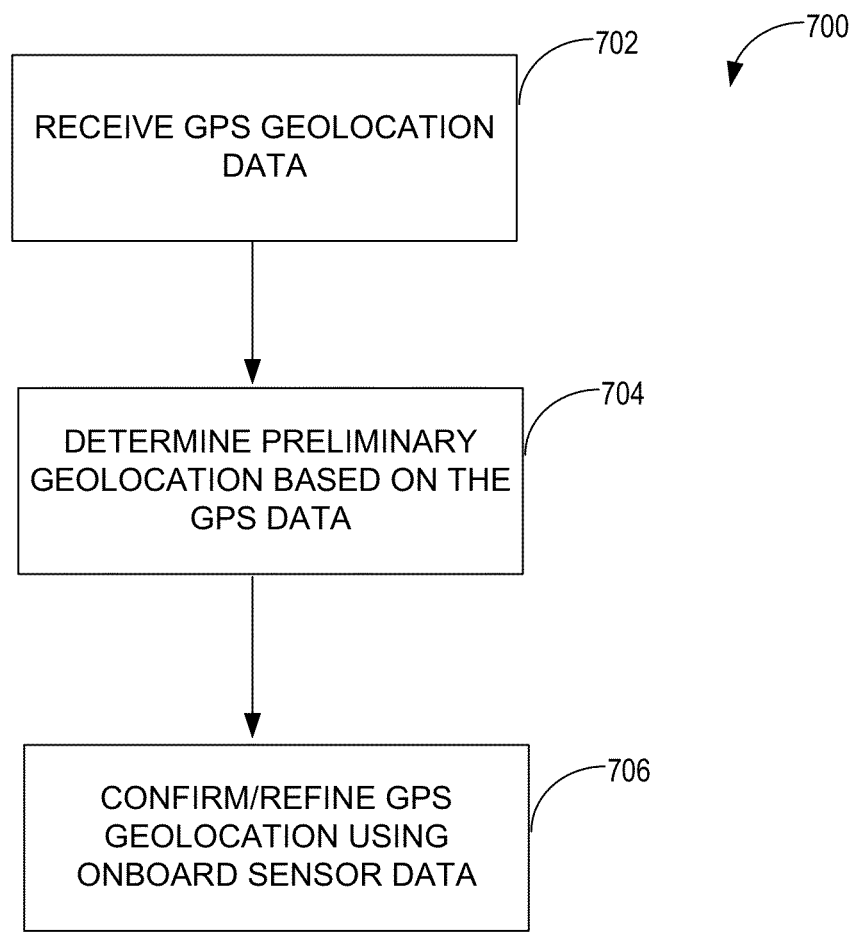
FIG. 7 is a block diagram illustrating an example process for refining/confirming GPS based geolocation using onboard vehicle sensor data.

FIG. 7 is a block diagram illustrating an example process for refining/confirming GPS based geolocation using onboard vehicle sensor data. In the example, shown, process 700 is executed on a processor on a vehicle or on a remote server. In 702, GPS geolocation data is received. In various embodiments, GPS geolocation data from a set of satellites are received by a GPS receiver onboard a moving vehicle. In 704, a preliminary geolocation of the moving vehicle is determined based on the received satellite geolocation data. Various algorithms can be used to perform such function. In 706, the geolocation is confirmed/refined based on onboard sensor data. In various embodiments, visual images of the geolocation can be used to confirm whether the GPS based geolocation is accurate. For example, the GPS determined geographic coordinates show that the vehicle location corresponds to a stop sign zone on a safety digital map. This can be confirmed/refined using images captured by an image capturing device, in which an image processing algorithm identifies a stop sign. In some embodiments, video images from a forward facing camera and a side facing camera are processed to determine whether the stop sign is in front of the vehicle or associated with a side street. In various embodiments, various other onboard vehicle sensor data such as a vehicle speed, a vehicle direction, a road gradient, a detected number of lanes, a vehicle trajectory, a presence of a traffic signal, a presence of intersection, and a detected road name can be used to confirm/refine the GPS geolocation. If the GPS geolocation corresponds to a road feature or characteristic that is consistent with the onboard vehicle sensor data, then the GPS geolocation is confirmed. If the GPS geolocation is not consistent with the vehicle sensor data, the GPS geolocation can be refined or adjusted to be consistent with the vehicle sensor data. Currently, GPS can be used to continuously track geolocation of a moving vehicle. However, it should be noted that a GPS can have poor time response and therefore the GPS determined geolocations are not exact and can be a few seconds of latitude or longitude off. Using onboard sensor data which have better time response to confirm/refine the GPS determined geolocation can result in a more accurate continuous estimation of the moving vehicle traveling path.

Figure 8:
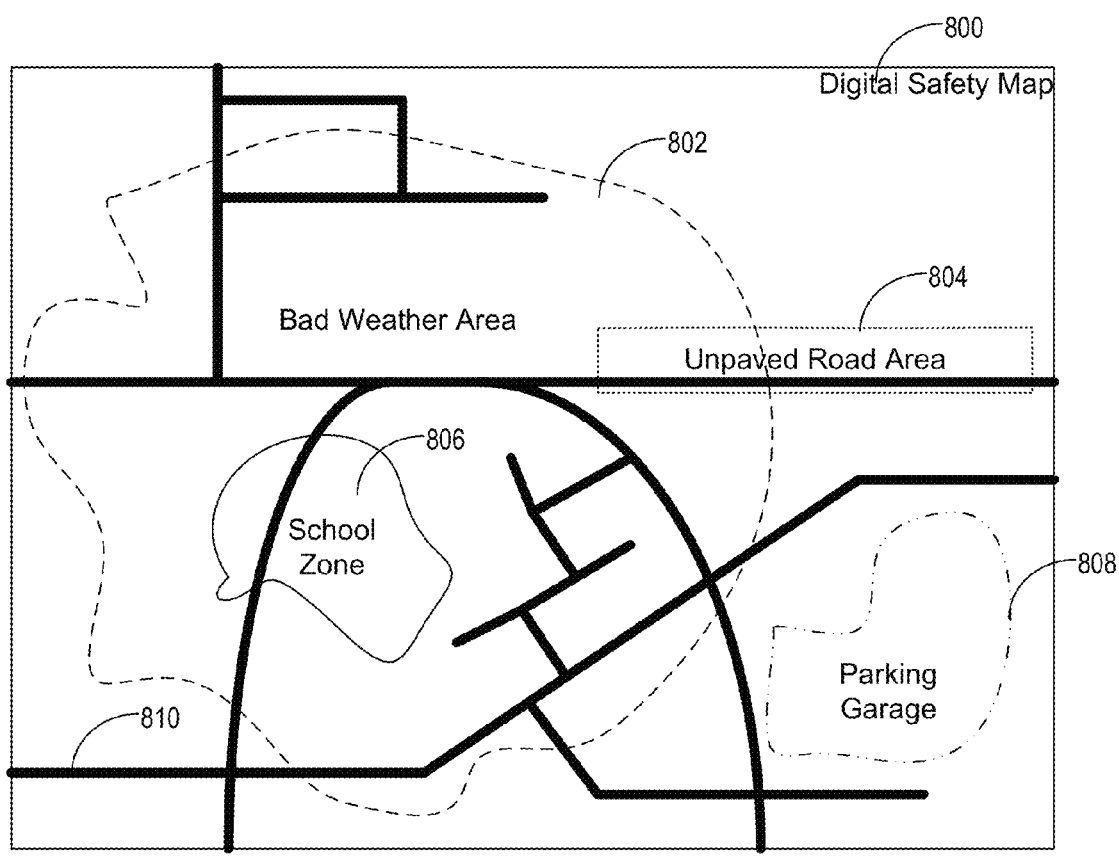
FIG. 8 is a diagram illustrating an example digital safety map in accordance with various embodiments.

FIG. 8 is a diagram illustrating an example digital safety map in accordance with various embodiments. In the example shown, digital safety map 800 comprises bad weather area 802, unpaved road area 804, school zone 806, parking garage 808, and roads 810. Digital safety map 800 includes street information (e.g., roads 810). Digital safety map 800 is divided into various geo-fenced zones that are defined by geo-boundaries. A geo-fenced area can be enclosed or bordered by a geo-boundary.

Examples of a geo-fenced zone include a posted speed zone that comprises a geographical area having a particular posted speed limit, a road grade or gradient zone that comprises a geographical area having a particular road gradient, a weather zone (e.g., bad weather area 802) that comprises a geographical area having a type of weather condition at a particular time, a stop sign zone that comprises a geographical area that includes a stop sign, a traffic signal zone that comprises a geographical area that includes a traffic signal, a school zone (e.g., school zone 806) that comprises a geographical area around a school. In various embodiments the geo-fenced area is defined based on driving condition(s) of the geolocation. The driving conditions can include a road condition, a weather condition, and/or a traffic condition. The geo-fenced area can be statically defined based on a static condition (e.g., where the condition does not substantially change over time). Examples of a statically defined geo-fenced zone or area comprise a school zone, a neighborhood zone, an intersection zone, a stop sign zone, and a traffic light zone. The geo-fenced area can be dynamically defined based on a dynamic condition (e.g., a condition that changes over time). Examples of a dynamically defined geo-fenced zone or area comprise a severe weather zone (e.g., based on dynamic weather conditions) and a traffic zone (e.g., based on dynamic traffic conditions).

In various embodiments, digital safety map 800 is saved or updated in a database associated with a computer onboard a moving vehicle that is used to determine a geolocation of the moving vehicle. Digital safety map 800 is used to associate various driving conditions such as road conditions, weather conditions, and traffic conditions to locations on the digital safety map. In various embodiments, various drive performance evaluation criteria are associated with geolocations (e.g., defined as geographical coordinates or geo-fenced area) on digital safety map 800. In various embodiments, driving conditions detected by onboard vehicle sensors can be used to update digital safety map 800. For example, stop signs detected using an image capturing device and an image recognition algorithm can be used to update the digital safety map. In various embodiments, the portion of digital safety map 800 saved to a database associated with an onboard computer can be limited to a portion of digital safety map 800 that will be likely be useful for the moving vehicle. This can be determined based on historical routes taken by the moving vehicle. In various embodiments, digital safety map 800 displays driving conditions to a driver (e.g., using a display of the onboard vehicle computer). In various embodiments, digital safety map 800 is updated periodically so that the map is kept current with regard to driving conditions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining driver performance based on vehicle geolocation, comprising:
   one or more onboard vehicle sensors configured to detect driving data of a moving vehicle;
   a GPS receiver for receiving a GPS geolocation of the moving vehicle and receiving an image captured by an image sensor of the one or more onboard vehicle sensors;
   one or more processors configured to:
      if the GPS geolocation matches the received image, confirm the GPS geolocation;
      if the GPS geolocation does not match the received image, adjust the GPS geolocation based at least in part on the driving data from the one or more onboard vehicle sensors and the image; and
      update a zone of a digital safety map corresponding to the GPS geolocation based on the received image, wherein the digital safety map associates various driving conditions to locations on the digital safety map;
      determine driver performance based at least in part on the driving data, wherein the driver performance is normalized for the vehicle geolocation; and
   a memory coupled to the one or more processors and configured to provide the processor with instructions.

2. The system of claim 1, wherein the driver performance measures driver safety performance.

3. The system of claim 1, wherein the driver performance measures driver fuel efficiency performance.

4. The system of claim 1, wherein normalizing the driver performance for geolocation comprises applying a drive performance evaluation criteria associated with the vehicle geolocation.

5. The system of claim 4, wherein the drive performance evaluation criteria normalizes an effect of a driving level of difficulty.

6. The system of claim 5, wherein the normalizing an effect of a driving level of difficult uses a performance weight.

7. The system of claim 4, wherein the vehicle geolocation is defined by a geo-fenced area on the digital safety map.

8. The system of claim 1, wherein the image sensor captures visual images of an exterior view from the vehicle.

9. The system of claim 1, wherein the GPS geolocation of the vehicle is determined using a cellular location tracking data.

10. The system of claim 1, wherein the image sensor captures images to identify a stop sign and confirm a stop sign zone.

11. The system of claim 1, wherein the driving data used to refine the vehicle geolocation comprises one or more of the following: a vehicle speed, a vehicle direction, a road gradient, a detected number of lanes, a vehicle trajectory, a presence of a traffic signal, a presence of intersection, and a detected road name.

12. The system of claim 1, wherein the one or more processors is further configured to: determine a geo-fenced area associated with the vehicle geolocation and a drive performance evaluation criteria associated with the geo-fenced area.

13. The system of claim 12, wherein the geo-fenced area is defined by a geo-boundary.

14. The system of claim 12, wherein the geo-fenced area is defined based on a driving condition.

15. The system of claim 14, wherein the driving condition comprises one or more of the following: a road condition, a weather condition, and a traffic condition.

16. The system of claim 14, wherein the driving condition is a dynamic driving condition.

17. The system of claim 14, wherein the driving condition is a static driving condition.

18. The system of claim 1, wherein the updating a zone of the digital safety map further includes using one of the confirmed GPS geolocation and the adjusted GPS geolocation to update a zone of the digital safety map.

19. A method for determining driver performance based on vehicle geolocation, comprising:
   detecting driving data using one or more onboard vehicle sensors of a moving vehicle;
   receiving a GPS geolocation of the moving vehicle using a GPS receiver;
   receiving an image captured by an image sensor of the one or more onboard vehicle sensors;

if the GPS geolocation matches the received image, confirming the GPS geolocation;

if the GPS geolocation does not match the received image, adjusting the GPS geolocation based at least in part on the driving data from the one or more onboard vehicle sensors and the image; and updating a zone of a digital safety map corresponding to the GPS geolocation based on the received image, wherein the digital safety map associates various driving conditions to locations on the digital safety map; and determining driver performance based at least in part on the driving data, wherein the driver performance is normalized for the vehicle geolocation.

20. A computer program product for determining driver performance based on vehicle geolocation, the computer program product being embodied in a non-transitory computer readable storage medium and comprising computer instructions for:

detecting driving data using one or more onboard vehicle sensors of a moving vehicle;

receiving a GPS geolocation of the moving vehicle using a GPS receiver;

receiving an image captured by an image sensor of the one or more onboard vehicle sensors;

if the GPS geolocation matches the received image, confirming the GPS geolocation;

if the GPS geolocation does not match the received image, adjusting the GPS geolocation based at least in part on the driving data from the one or more onboard vehicle sensors and the image; and updating a zone of a digital safety map corresponding to the GPS geolocation based on the received image, wherein the digital safety map associates various driving conditions to locations on the digital safety map; and determining driver performance based at least in part on the driving data, wherein the driver performance is normalized for the vehicle geolocation.

\* \* \* \* \*